Aug. 10, 1926.
E. P. DOYLE
1,595,862
COUPLING DEVICE FOR VEHICLES
Original Filed August 21, 1912   2 Sheets-Sheet 1
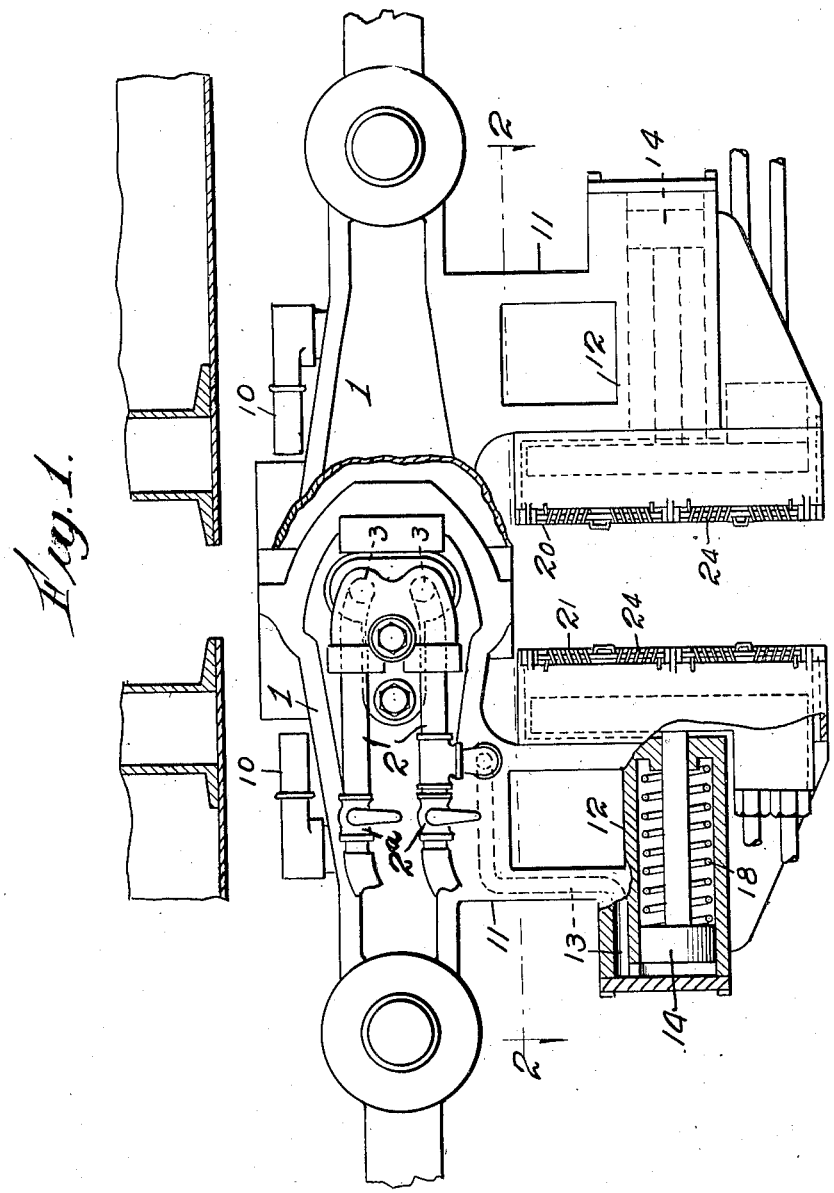

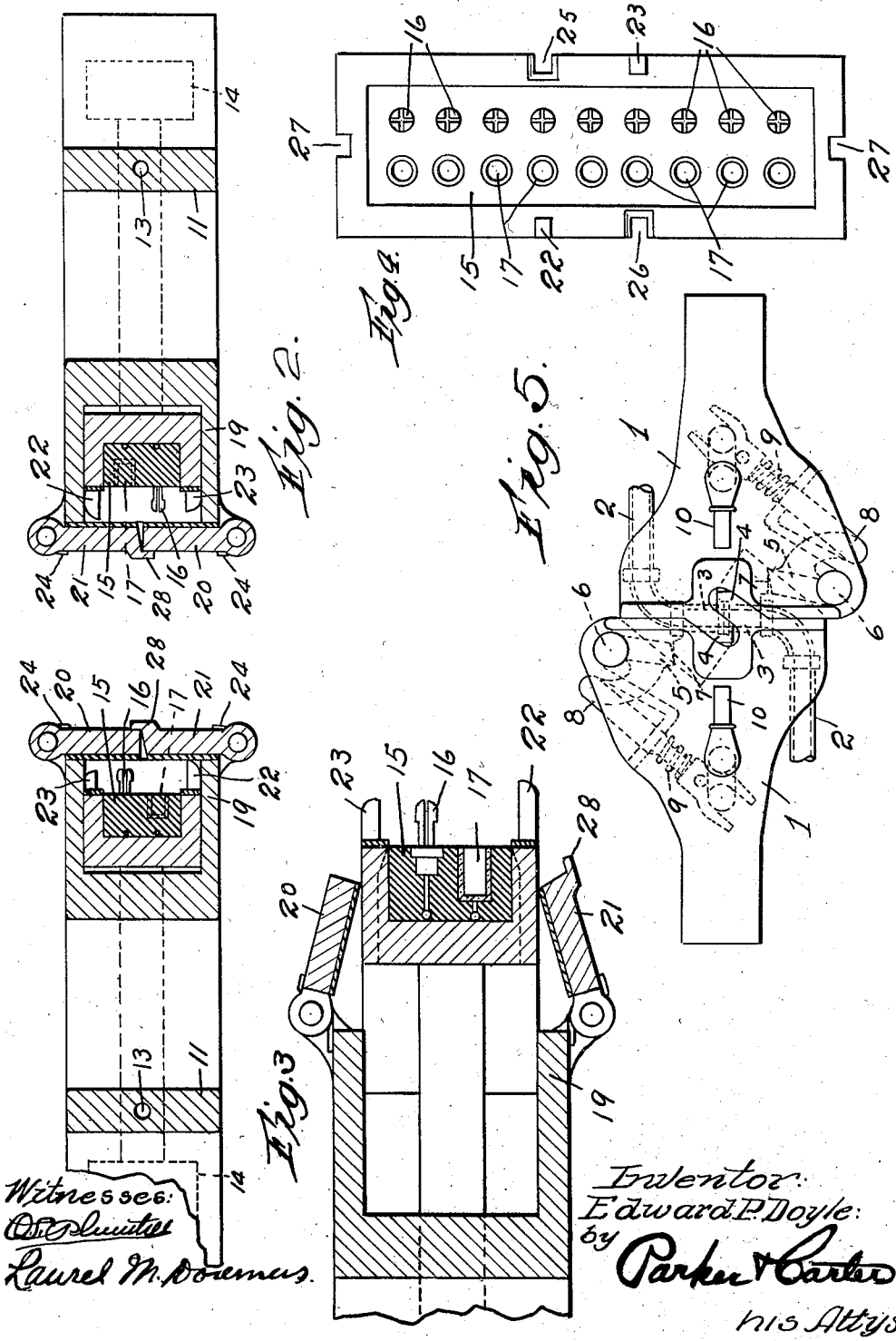

Patented Aug. 10, 1926.

1,595,862

UNITED STATES PATENT OFFICE.

EDWARD P. DOYLE, OF PULLMAN, ILLINOIS, ASSIGNOR TO WILLIAM T. VAN DORN, OF CHICAGO, ILLINOIS, EMMA B. VAN DORN, AND HERBERT E. VAN DORN, EXECUTORS OF SAID WILLIAM T. VAN DORN, DECEASED.

COUPLING DEVICE FOR VEHICLES.

Original application filed August 21, 1912, Serial No. 716,144, Patent No. 1,208,929, dated December 19, 1926. Divided and this application filed December 1, 1916, Serial No. 134,431. Renewed January 12, 1926.

This invention relates to car coupling devices particularly adapted to be used in connection with electrically operated cars or vehicles and has for its object to provide a new and improved device of this description. This application is a division of my application for coupling devices for vehicles filed August 21, 1912, Serial No. 716,144, Patented Dec. 19, 1916, No. 1,208,929.

The invention is illustrated in the accompanying drawings, wherein—

Figure 1 is a side view with parts broken away showing one form of coupling or connecting device embodying the invention;

Figure 2 is a sectional view taken on line 2—2 of Figure 1;

Figure 3 is an enlarged sectional view of one of the electrical connector elements in part section in its operative position.

Figure 4 is a front view of one of the electrical connector elements.

Figure 5 is a plan view of the device shown in Figure 1.

Like numerals refer to like parts throughout the several figures.

As illustrated in Figure 1 I have shown one form of my invention. In this construction each car or vehicle is provided with the mechanical coupler heads 1 by means of which vehicles are mechanically connected together. These coupler heads 1 are preferably arranged so as to make the air connection between the vehicles. Any suitable arrangement for this purpose may be used.

In the particular construction illustrated in Figure 1 the coupler heads have connected thereto the air pipes 2 provided with the valves 2ª. The engaging faces of the coupler heads are provided with openings 3 with which these pipes communicate, arranged so that when these faces are brought together the openings register and a tight connection is made between the air pipes of the two coupler heads. This connection is arranged so that it is made automatically.

In the construction shown in Figure 1 each coupler head is provided with an interlocking part 4 with a locking piece 5 mounted upon the pivot 6. The interlocking piece is provided with the recess 7 into which the locking piece 5 is received when the parts are in their coupled position. The locking part 5 has connected therewith an arm 8 provided with the spring 9 said arm being controlled by the lever 10. As the interlocking pieces 4 move into their operative position they strike the locking parts 5 and move them back thus compressing the spring 9. When the locking parts have moved to their interlocking position the receiving opening 7 is opposite the locking parts and said locking parts are then forced into the receiving openings by the spring 9 thereby holding the coupler heads in their locking position. The locking parts 5 are removed from the recess 7 by means of the lever 10.

Associated with the coupler heads are the electrical coupling devices for automatically making the electrical connections between the cars or vehicles. As illustrated in Figures 1 to 4 each mechanical coupler head has connected therewith an electrical coupler head consisting of a frame 11 provided with a cylinder 12. An air connection 13 leads from one of the air pipes 2 to the cylinder 12. Within the cylinder 12 is a piston 14 having a piston rod which projects therefrom and which carries at its end the electrical connector element 15. This electrical connector element is provided on one side with the pins or plugs 16 and on the other side with the sockets 17. When two connector elements are brought together the pins of one element enter the sockets of the other element thus making the electrical connection. This arrangement insures the proper connection of the two elements when the cars are brought together. The electrical connectors are connected with the pins 16 and sockets 17. The parts are arranged so that when the mechanical coupling is made the electrical connector elements are brought into proper alignment and are then automatically brought into connection such connector elements having a movement independent of the movement of the cars to be coupled and the mechanical coupler heads. In the construction illustrated in Figure 1 the mechanical coupler heads when brought together make the air connections and the air then passing into cylinder 12 acts upon the piston 14 and the electrical connector elements are automatically moved out into electrical connection. The spring 18 moves the electrical connector element back to its initial position when the mechanical coupler heads are disconnected. Some suitable means is provided for protecting the electrical connector elements from the weather so as to prevent corrosion of the contacts and short circuiting thereof.

As illustrated in Figures 1 to 3 the electrical connector elements are normally contained within an enclosing device 19 provided with the doors 20 and 21 normally closed as shown in Figure 2. When the connector element is moved outwardly the door-engaging parts 22 and 23 engage said doors and move them out of the way as shown in Figure 3. These doors are provided with closing springs 24. When the two electrical connector elements engage, the door-engaging part 22 of one element enters the receiving opening 25 of the other element and the door-engaging part 23 of one element enters the receiving space 26 of the other element. (See Figure 4.) These elements are also provided at the top and bottom with the guide-ways 27 which engage suitable guides associated with the enclosing device 19. When the mechanical coupler heads are disconnected and the electrical connector elements move back into the enclosing device 19 the doors 20 and 21 are automatically closed. The door 21 is provided with an overlapping piece 28. In order that the door 20 may close slightly before the door 21 so as to bring the overlapping piece 28 on the outside the door-engaging piece 22 is made longer than the door-engaging piece 23. By this means the door 21 is made to close somewhat slower than the door 20.

Referring to Figures 3 and 4, I prefer to make openings 25 and 26 with beveled faces as indicated so that if there is any wear in the guides the parts 23 and 22 entering said beveled faces will properly center the electrical connection. I have described in detail the particular construction embodying my invention, but it is, of course, evident that the parts may be varied in many particulars without departing from the spirit of the invention and I therefore do not limit myself to the particular construction shown.

It will be noted that in this construction the electrical connector elements and the electrical contacts are protected from the elements, so that although the cars may be left outdoors exposed to the rain, sleet and snow, these electrical contacts will be protected therefrom, the rain, snow and sleet being excluded therefrom when the electrical connector elements are disconnected. This is an important feature in actual practice. It will be noted that in this construction the electrical contacts are drawn into a protecting or enclosing device, and that they are then protected from the weather, and that additional protection is secured by means of the doors. It will further be noted that to make the electrical coupling the electrical contacts are moved with relation to the enclosing or protecting device so as to project therefrom, and thus permit them to be electrically connected.

I claim:

1. A coupling device for vehicles comprising an electrical coupling having a movable coupler head, a self-closing protecting device associated with said electrical coupler head adapted to be automatically opened by the movement of the coupler head to expose the electrical contacts of said coupler head and to be automatically closed to protect said contacts from the elements, by the movement of the coupler head.

2. A coupling device for vehicles, comprising an electrical coupling device having two coupler elements one connected with each vehicle, said coupler elements provided with electrical contacts, a protecting casing on each vehicle, each protecting casing containing one of said coupler elements, each coupler element with its electrical contacts being enclosed within its associated casing, and means for moving both of said coupler elements, with relation to their associated casings so as to cause the electrical contacts to be moved outside of the casings in order that the electrical connection between the contacts may be completed.

3. A coupling device for vehicles, comprising an electrical coupling device having two coupler elements one connected with each vehicle, said coupler elements provided with electrical contacts, a protecting casing on each vehicle, each protecting casing containing one of said coupler elements, each coupler element with its electrical contacts being enclosed within its associated casing, and means for moving both of said coupler elements with relation to their associated casings so as to cause the electrical contacts to be moved outside of the casings in order that the electrical connection between the contacts may be completed, doors associated with each casing, said doors engaged by said coupler elements so as to be moved out of the way when the coupler elements are moved to their coupling position.

4. A coupling device for vehicles, comprising an electrical coupling device having two coupler elements one connected with each vehicle, said coupler elements provided with electrical contacts, a protecting casing on each vehicle, each protecting casing containing one of said coupler elements, each coupler element with its electrical contacts being enclosed within its associated casing, and means for moving both of said coupler elements with relation to their associated casings so as to cause the electrical contacts to be moved outside of the casings in order that the electrical connection between the contacts may be completed, doors associated with each casing, said doors engaged by said coupler elements so as to be moved out of the way when the coupler elements are moved to their coupling position, and means for automatically moving said doors to their closed positions when the coupler elements are moved into said casings.

5. A coupling device for vehicles, comprising an electrical coupling device having two coupler elements, one connected with each vehicle, protecting devices in which said coupling elements are movably mounted, and an automatically actuated door for each protecting device protecting the end thereof when the coupling devices are uncoupled.

In testimony whereof, I affix my signature this 15th day of November 1916.

EDWARD P. DOYLE.